United States Patent
Malhotra et al.

[11] Patent Number: 5,876,492
[45] Date of Patent: Mar. 2, 1999

[54] INK COMPOSITIONS CONTAINING ESTERS

[75] Inventors: Shadi L. Malhotra; Danielle C. Boils, both of Mississauga, Canada

[73] Assignee: Xerox Corporation, Stamford, Conn.

[21] Appl. No.: 936,084

[22] Filed: Sep. 23, 1997

[51] Int. Cl.[6] .................................................. C09D 11/02
[52] U.S. Cl. .................................... 106/31.58; 106/31.29; 106/31.27
[58] Field of Search .............................. 106/31.58, 31.29, 106/31.27

[56] References Cited

U.S. PATENT DOCUMENTS

| | | | |
|---|---|---|---|
| 4,490,731 | 12/1984 | Vaught | 346/140 R |
| 4,751,528 | 6/1988 | Spehrley, Jr. et al. | 346/140 R |
| 4,791,439 | 12/1988 | Guiles | 346/140 R |
| 4,840,674 | 6/1989 | Schwarz | 106/22 |
| 4,853,036 | 8/1989 | Koike et al. | 106/20 |
| 5,006,170 | 4/1991 | Schwarz et al. | 106/20 |
| 5,017,225 | 5/1991 | Nakanishi et al. | 106/31.21 |
| 5,041,161 | 8/1991 | Cooke et al. | 106/22 |
| 5,069,719 | 12/1991 | Ono | 106/31.58 |
| 5,098,477 | 3/1992 | Vieira et al. | 106/31.27 |
| 5,121,141 | 6/1992 | Hadimoglu et al. | 346/140 R |
| 5,122,187 | 6/1992 | Schwarz et al. | 106/25 |
| 5,124,718 | 6/1992 | Koike et al. | 346/1.1 |
| 5,151,120 | 9/1992 | You et al. | 106/31.29 |
| 5,302,439 | 4/1994 | Malhotra et al. | 428/195 |
| 5,409,530 | 4/1995 | Kanbayashi et al. | 106/31.29 |
| 5,451,458 | 9/1995 | Malhotra | 428/412 |
| 5,709,976 | 1/1998 | Malhotra | 430/124 |

OTHER PUBLICATIONS

IBM Technical Disclosure Bulletin, vol. 16, No. 4, Sep. 1973, pp. 1168 to 1170, N.C. Loeber et al., "Tactile Display System".

*Primary Examiner*—Mark L. Bell
*Assistant Examiner*—Veronica Faison
*Attorney, Agent, or Firm*—E. O. Palazzo

[57] ABSTRACT

An ink comprised of (1) a liquid ester vehicle, (2) a solid ester compound, (3) a liquid crystalline ester compound, (4) a UV absorber, (5) an antioxidant, and (6) a colorant.

24 Claims, No Drawings

INK COMPOSITIONS CONTAINING ESTERS

REFERENCE TO COPENDING PATENT APPLICATIONS AND PATENTS

Hot melt acoustic inks are illustrated in copending patent applications U.S. Ser. No. 624,154, now U.S. Pat. No. 5,688,312, U.S. Ser. No. 624,157, now U.S. Pat. No. 5,667,588, U.S. Ser. No. 624,156, now U.S. Pat. No. 5,700,316, U.S. Ser. No. 624,273, now U.S. Pat. No. 5,747,554, and U.S. Ser. No. 641,866, the disclosures of each being totally incorporated herein by reference.

Also, inks are illustrated in copending applications U.S. Ser. Nos. 935,929, 933,914, 935,889 and 935,639, the disclosures of each application being totally incorporated herein by reference.

The components of the inks of the copending applications, such as the colorants, ink additives, and the like may be selected for the inks of the present invention in embodiments thereof.

BACKGROUND OF THE INVENTION

The present invention is directed to ink compositions and more specifically, the present invention relates to semi-solid hot melt inks with a melting point of for example, from about 25° C. to about 40° C., and which inks are especially useful for acoustic ink printing, processes and apparatuses, reference, for example, U.S. Pat. No. 5,121,141, U.S. Pat. No. 5,111,220, U.S. Pat. No. 5,128,726, U.S. Pat. No. 5,371,531, the disclosures of which are totally incorporated herein by reference, including especially acoustic ink processes as illustrated in the aforementioned copending applications such as an acoustic ink printer for printing images on a record medium.

The inks of the present invention in embodiments thereof are comprised of (1) a liquid non-aqueous vehicle with a boiling point of higher than, or equal to about 150° C. and lower than, or equal to about 350° C., and more specifically from about 175 to about 325, and yet more specifically from about 225 to about 300 degrees Centigrade, and low acoustic loss to reduce, or minimize energy consumption, and which acoustic loss is for example, below, or about equal to 60 dB/mm, (2) a solid paper ester contained in the pores of a substrate, such as paper and which ester possesses a melting point of for example, lower than about, or equal to about 75° C. and preferably between about 35° to about 74° C. and with a low acoustic loss of from about less than about 100 dB/mm, (3) a liquid crystalline ester compound, (4) a lightfastness UV absorber, (5) a lightfastness antioxidant, (6) and a colorant such as a dye, a pigment or mixtures thereof. More specifically, the present invention is directed to semi-solid hot melt acoustic ink compositions comprised of (1) non-aqueous ester liquid vehicles with a boiling point of for example, higher than about 150° C. and lower than about 350° C., preferably between about 170° and about 300° C., and with a low acoustic loss below or equal to about 60 dB/mm, and preferably in the range of between about 5 to about 40 dB/mm, (2) a non-aqueous solid ester with a melting point of for example, lower than about 75° C. and preferably between about 35° to about 74° C., and with a low acoustic loss below, or equal to about 100 dB/mm, and preferably in the range of between about 25 to about 80 dB/mm, (3) a liquid crystalline ester compound, (4) an ester UV absorber, (5) an ester antioxidant, and (6) a colorant, and wherein there can be generated with such inks excellent developed images on substrates, such as plain and coated papers with acceptable image permanence, excellent projection efficiency on transparencies without a post fusing step, and excellent crease resistance, and wherein the inks possess acceptable, and in embodiments superior lightfastness, and superior waterfastness. Moreover, in embodiments of the present invention there is enabled the elimination, or minimization of undesirable paper curl since water is preferably not present in the inks, and it is preferred that there be an absence of water, thus a dryer can be avoided thereby minimizing the cost of the acoustic ink jet apparatus and process.

PRIOR ART

In acoustic ink printing, the printhead generates approximately 2.2 picoliter droplets by an acoustic energy process. The ink under these conditions should display a melt viscosity of about 5 to about 20 centipoise or less at the jetting temperature. Furthermore, once the ink is jetted onto the paper, the ink image should be of excellent crease property, and should be non-smearing, waterfast, of excellent transparency and excellent fix qualities. In selecting an ink for such applications, the ink vehicle should display a low melt viscosity, such as from about 1 centipoise to about 25 centipoise in the acoustic head, while also displaying solid like properties after being jetted onto paper. As the acoustic head can tolerate a temperature up to about 180° C., and preferably a temperature of from about 140° C. to about 160° C., the vehicle for the ink should preferably display liquid like properties such as a viscosity of from about 1 to about 10 centipoise at a temperature of from about 75° to about 165° C., and solidify or harden after jetting onto paper, and wherein the ink displays a hardness value of from about 0.1 to about 0.5 millimeter as measured with a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle can be selected to possess a melting point above room temperature, and wherein the ink which is melted in the apparatus will not be subject to evaporation or spillage during periods of nonprinting. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being transported into the paper by capillary action, thereby attempting to enable higher print density than is generally obtained with liquid inks. Hot melt ink jets are somewhat similar to thermal ink jets, however, a hot melt ink usually contains no solvent. Thus, rather than being liquid at room temperature, a hot melt ink is typically a solid or semi-solid having a wax-like consistency. These inks usually need to be heated, for example, to approximately 100° C. before the ink melts and turns into a liquid. With hot melt inks, a plurality of ink jet nozzles are provided in a printhead. A piezoelectric vibrating element is located in each ink channel upstream from a nozzle so that the piezoelectric oscillations propel ink through the nozzle. After the hot melt ink is applied to the substrate, the ink is resolidified by freezing onto a substrate.

Each of these types of known ink jets, however, has a number of advantages and disadvantages. One advantage of thermal ink jet systems is their compact design for the integrated electronics section of the printhead. Thermal ink jets are disadvantageous in that the thermal ink has a tendency to soak into a plain paper medium, which blurs the print or thins out the print locally thereby adversely affecting print quality. Problems have also been encountered with thermal ink jets in attempting to remove from the ink in a rapid manner moisture so that the ink does not soak into a plain paper medium. One advantage of a semi-solid hot melt ink jet is its ability to print on coated substrates such as coated papers and overhead transparencies yielding photographic quality images, since the semi-solid hot melt ink quickly spreads on the surface of the coated paper and transparencies.

U.S. Pat. No. 4,751,528, the disclosure of which is totally incorporated herein by reference, discloses a semi-solid hot melt ink jet system which includes a temperature-controlled platen provided with a heater, a thermoelectric cooler electrically connected to a heat pump and a temperature control unit for controlling the operation of the heater and the heat pump to maintain the platen temperature at a desired level.

Further, U.S. Pat. No. 4,791,439, the disclosure of which is totally incorporated by reference, discloses an apparatus for use with semi-solid hot melt inks with an integrally connected ink jet head and reservoir system.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, and which solvent has permanently dissolved therein spirit soluble dyes.

U.S. Pat. No. 5,006,170 and U.S. Pat. No. 5,122,187, the disclosures of each of which are totally incorporated herein by reference, disclose semi-solid hot melt ink compositions suitable for ink jet printing and which inks comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like.

U.S. Pat. No. 5,041,161, the disclosure of which is totally incorporated herein by reference, discloses an ink jet ink which is semi-solid at room temperature. The inks of this patent can be comprised of vehicles, such as acids, aldehydes and mixtures thereof, and wherein the ink can be impulse jetted at an elevated temperature in the range of about 45° C. to about 110° C., at which temperature the ink has a viscosity of about 10 to 15 centipoise.

U.S. Pat. No. 4,853,036 and U.S. Pat. No. 5,124,718 disclose an ink for ink jet recording which comprises a liquid composition essentially comprising colorant, a volatile solvent having a vapor pressure of 1 millimeter Hg or more at 25° C., and a solid at room temperature.

SUMMARY OF THE INVENTION

While the known ink compositions and processes may be suitable for their intended purposes, a need remains for acoustic semi-solid hot melt ink compositions suitable for thermal ink jet printing. In addition, there is a need for semi-solid hot melt ink compositions which are compatible with a wide variety of plain papers and yield photographic quality images on coated papers. Further, there is a need for semi-solid hot melt ink compositions which generate high quality, lightfast, waterfast images on plain papers. There is also a need for semi-solid hot melt ink jet ink compositions which generate high quality, fast-drying images on a wide variety of plain papers at low cost with high quality text and high quality graphics, and wherein the colorant, like a dye is retained on the paper surface while the ink vehicle can continue to spread within the paper structure. Further, there is a need for semi-solid hot melt ink jet ink compositions which exhibit minimal feathering. Additionally, there is a need for semi-solid hot melt ink jet ink compositions which exhibit minimal intercolor bleed. There is also a need for semi-solid hot melt ink jet ink compositions which exhibit excellent image permanence. Further, there is a need for semi-solid hot melt ink jet ink compositions which are suitable for use in acoustic ink jet printing processes. Additionally, there is a need for semi-solid hot melt ink compositions suitable for ink jet printing processes wherein the substrate is heated prior to printing and is cooled to ambient temperature subsequent to printing (heat and delay printing processes). There is also a need for ink compositions suitable for ink jet printing wherein high optical densities can be achieved with relatively low colorant, like dye concentrations. A need also remains for ink compositions suitable for ink jet printing wherein curling of the substrate, such as paper, subsequent to printing is minimized, or avoided. These and other needs can be achievable with the inks of the present invention in embodiments thereof.

DETAILED DESCRIPTION OF THE INVENTION

In embodiments the ink compositions of the present invention comprise a colorant, such as a pigment, dye, or mixtures thereof, and a liquid vehicle with an acoustic-loss value of for example, less than, or equal to about 60 dB/mm, and preferably between about 5 to about 40 dB/mm, and a boiling point of for example, greater than, or equal to about 150° C., and preferably between about 170° to about 300° C., and a solid ester which prevents, or minimizes penetration of the ink colorant, such as the ink dye into the fibers of the paper, and which ester possesses a melting point of for example, lower than, or equal to about 75° C. and preferably between about 35° and about 74° C., and an acoustic loss value of for example, less than, or equal to about 100 dB/mm and preferably between about 25 to about 80 dB/mm, a liquid crystalline ester compound, an ester UV absorbing compound, an ester antioxidant and wherein the ink melts at appropriate temperatures, such as from about 25 to about 55 degrees Centigrade.

Embodiments of the present invention include: a onaqueous ink composition comprised of (1) a liquid ester vehicle with an acoustic-loss value of from about 5 to about 40 dB/mm, (2) a solid ester compound with a melting point of from about 35° to about 75° C. and an acoustic-loss value of from about 25 to about 80 dB/mm, (3) a liquid crystalline ester compound, (4) a lightfastness UV absorber, (5) a lightfastness antioxidant, and (6) a colorant; a naqueous ink composition wherein the liquid ester vehicle with an acoustic-loss value of from about 5 to about 40 dB/mm is present in an amount of from about 0.5 to about 49, or from about 5 to about 35 percent by weight, or parts, the solid ester compound (2) is present in an amount of from about 0.5 to about 49, or from about 5 to about 35 percent by weight, the liquid crystalline ester compound (3) is present in an amount of from about 69 to about 1, or from about 5 to about 40 percent by weight, the lightfastness UV absorber (4) is an ester present in an amount of from about 5 to about 0.25, or from about 1 to about 3 percent by weight, the antioxidant is an ester present in an amount of from about 5 to about 0.25, or from about 1 to about 3 percent by weight, and the colorant is present in an amount of from about 20 to about 0.5, from about 1 to about 15, or from about 2 to about 12 percent by weight, and which ink has an acoustic-loss value of from about 10 to about 80 dB/mm, and which ink possesses a viscosity of from about 1 centipoise to about 20, preferably about 10 centipoise at a temperature of from about 125° C.; to about 165° C.; a nonaqueous ink wherein the ester vehicle with an acoustic-loss value of from about 5 to about 40 dB/mm, is selected from the group consisting of cyclic ester lactones of (1) γ-butyrolactone, (2)α-acetyl-α-methyl γ-butyrolactone, (3) (±)-β,β-dimethyl γ-(hydroxymethyl)-γ-butyrolactone, (4) γ-valerolactone, (5) β-hydroxy-β-methyl-δ-valerolactone, (6) γ-octanoic lactone, (7) decanolactone, (8) undecanoic-ω-lactone, (9) oxacyclotridecan-2-one, and (10)ω-penta decalactone; wherein the ester vehicle with an acoustic-loss value of from about 5 to about 40 dB/mm, is selected from the group consisting of alkyl esters of (1) methyl tridecanoate, (2) ethyl tetradecanoate, (3) diethyl tetradecane dioate, (4) diethyl propyl malonate, (5) suberic acid monomethyl ester, (6) ethyl-trans-cinnamate, (7) ethylene dodecanedioate, (8) isobutyl-2-buteneoate, (9) dimethyl anthranilate, and (10) ethyl decane-cis-4-trans-2-dienoate; wherein the solid ester compound is selected from the group consisting of solid alkyl esters of (1) methyltetracosanoate, (2) ethyl2-oxocylotridecanecarboxylate, (3) ethyltriacontanoate, (4) (N-(tert -butoxy carbonyl)-3-cyclohexyl-L-alanine methyl ester, (5) (N-(tert-butoxy carbonyl) glycine tert-butylester, (6) (N-(tert-butoxy carbonyl)-D-alanine methyl ester, (7) (N-(tert-butoxycarbonyl)-L-alanine methyl ester, (8) (N-(tert-butoxy carbonyl)-L-phenyl alanine methyl ester, (9) (N-(tert-butoxy carbonyl)-3-iodo-D-alaninemethylester, and (10) N-carbobenzyloxy-L-glutamic acid 1-methyl ester; wherein the liquid crystalline ester compound is selected from the group consisting of (1) (−) 2-methylbutyl-4-(4'-methoxy benzylidene-amino) cinnamate, (2) (S)-(+)-2-methylbutyl-4-(4-decyloxybenzylidene-amino) cinnamate, (3) ethyl-4-ethoxybenzyl-4'-aminocinnamate, (4) 4-[(R)-(−) 2-chloro-3-methylbutyryl oxy]phenyl-4-(decyloxy) benzoate, (5) 4-[(S)-(+)2-chloro-3-methylbutyryl] phenyl-4-(decyloxy) benzoate, (6) 4-[(S)-(+)-(4-methylhexyl)oxy] phenyl-4-(decyloxy) benzoate, (7) 4-[(S)-(−)-2-ethoxypropoxy] phenyl-4-(decyloxy) benzoate, (8) 4-[(1-methylheptyloxy)carbonyl]phenyl-4'-octyloxy-4-biphenylcarboxylate, (9) cholesteryl oleate, and (10) cholesteryl oleyl carbonate; wherein the UV absorber is selected from the group consisting of (1) glycerol 4-amino benzoate, (2) resorcinol mono benzoate, (3) octyl dimethyl amino benzoate, (4) hexadecyl 3,5-di-tert-butyl-4-hydroxy-benzoate, (5), octyl salicylate, and (6) octyl methoxy cinnamate; wherein the antioxidant is selected from the group consisting of (1) didodecyl-3,3'-thiodipropionate, (2) ditetradecyl-3,3'-thiodipropionate, (3) diocta decyl-3,3'-thio dipropionate, (4) triethyleneglycol-bis[3-(3'-tert-butyl-4'-hydroxy-5'-methyl-phenyl)propionate], (5) 3-hydroxy-2,2-dimethylpropyl3-hydroxy-2,2-di methylpropionate, (6) 1,6-hexamethylene-bis (3,5-di-tert-butyl-4-hydroxyhydro cinnamate), (7) tetrakis [methylene (3,5-di-tert-butyl-4-hydroxyhydrocinnamate), (8) thiodiethylene-bis (3,5-di-tert-butyl-4-hydroxy) hydrocinnamate, (9) octadecyl-3,5-di-tert-butyl-4-hydroxyhydrocinnamate, (10) 2,2-bis [4-(2-(3, 5-di-tert-butyl-4-hydroxhydrocinnamoyloxy)) ethoxyphenyl] propane; wherein the colorant is selected in an amount of from about 0.5 to about 20 percent by weight; wherein the colorant is selected in an amount of from about 2 to about 12 percent by weight; wherein the colorant is a pigment, or a dye; wherein the colorant is cyan, magenta, yellow, black, or mixtures thereof; wherein (1) the liquid ester vehicle is y-butyrolactone;diethyl propyl malonate, (2) the solid ester compound is methyl tetracosanoate, or (N-(tert-butoxy carbonyl) glycine tert-butylester, (3) the liquid crystalline ester compound is (R)-4-[(1-methylheptyloxy) carbonyl]phenyl 4'-octyloxy-4-biphenyl carboxylate, or 4-[ (R)-(−) 2-chloro-3-methyl butyryloxy] phenyl-4-(decyloxy) benzoate, (4) the UV absorber is hexadecyl 3,5-di-tert-butyl-4-hydroxy-benzoate, or glycerol 4-amino benzoate, and (5) the I antioxidant is 3-hydroxy-2,2-dimethyl propyl-3-hydroxy-2,2-dimethyl propionate, or dioctadecyl-3,3'-thiodipropionate; an ink with a viscosity of from about 1 centipoise to about 5 centipoise, or with a viscosity of from about 1 centipoise to about 10 centipoise and an acoustic loss of from about 25 to about 65 dB/mm; an ink comprised of (1) a liquid ester vehicle, (2) a solid ester compound, (3) a liquid crystalline ester compound, (4) a UV absorber, (5) an antioxidant, and (6) a colorant; an ink wherein the UV absorber is an ester, the antioxidant is an ester, and wherein said ink possesses an acoustic-loss value of from about 10 to about 80 dB/mm and a viscosity of from of from about 1 to about 20 centipoise; an ink wherein the colorant is present in an amount of from about 1 to about 15 weight percent, and said viscosity is from about 1 to about 10 at a temperature of from about 135 to about 150 degrees Centigrade; an ink wherein (1) said liquid ester vehicle possesses an acoustic-loss value of from about 5 to about 40 dB/mm, (2) said solid ester compound possesses a melting temperature of from about 35° to about 75° C. and an acoustic-loss value of from about 25 to about 80 dB/mm, (4) said UV absorber is an ester, (5) said antioxidant is an ester, and wherein said ink has an acoustic-loss value of from about 10 to about 80 dB/mm, a melting temperature of from about 25 to about 45 degrees Centigrade, and a viscosity of from about 1 centipoise to about 10 centipoise at a temperature of from about 125° C. to about 165° C.; a printing process which comprises incorporating into an acoustic ink jet printer the invention ink and causing droplets of the ink to be ejected in imagewise pattern onto a substrate; A process which comprises (a) providing an acoustic ink printer having a pool of the invention ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate; a printing process wherein there is selected an ink comprised of (1) a liquid ester vehicle with an acoustic-loss value of from about 5 to about 40 dB/mm, (2) a solid ester compound with a melting point of from about 35° to about 74° C., (3) a liquid crystalline ester compound, (4) an ester lightfastness UV absorber, (5) an ester lightfastness antioxidant, and (6) a colorant, and which ink has an acoustic-loss value of from about 10 to about 80 B/mm, and a viscosity of from about 1 centipoise to about 10 centipoise at a temperature of from about 125° C. to about 165°C.

The liquid ester vehicle with for example, a boiling point of higher than about, or equal to about 150° C. and preferably from about 170° to about 300° C. and with an acoustic-loss value of for example, from about 5 to about 40, or from about 10 to about 25 dB/mm is present in the ink composition in a suitable amount, for example, in an amount of from about 0.5 to about 49, about 5 to about 30 percent by weight, or other effective amounts, and which vehicle possesses a melting temperature, or melting point of for example, from about 35° to about 75°, or from about 45° to about 60° C., and having an acoustic-loss value of for example, below about 100 dB/mm and preferably from about 25 to about 80, or from about 35 to about 65 dB/mm is present in an amount of from for example, about 0.5 to about 49, about 5 to about 25 percent by weight, or other effective amount, the ester containing liquid crystalline compound is present in an amount of for example, from about 69 to about 1, from about 10 to about 45 percent by weight, or other effective amount, the UV absorber is present in an amount of from for example, about 5 to about 0.25, from about 1 to about 3 percent by weight, or other effective amount, the antioxidant is present in an amount of for example, from about 5 to about 0.25, from about 1 to about 5 percent by weight, or other effective amount, and the colorant is present in an amount of from about 0.5 to about 20, from about 1 to about 15, from about 2 to about 12 percent by weight, and the like. The total of all the ink components is about 100 percent, or about 100 parts. In embodiments the ink of the present is comprised of (1) a low acoustic-loss ester vehicle, (2) a solid ester paper additive, (3) a liquid crystalline ester, (4) a lightfastness ester UV absorber, (5) a lightfastness ester antioxidant, and (6) a colorant, and which ink possesses for example, the following composition range amounts in the sequence (1), (2), (3), (4), (5), and (6) [0.5+0.5+69+5+5+20=100] to [49+49+1+0.25+0.25+0.5=100]. The ink composition may also in embodiments possess the following preferred composition range [5+5+65+5+5+15=100] to [45+45+7+1+1+1=100]. These composition ranges can be determined by a number of known methods, and were established using a statistical design based on the analyses of the experimental data of viscosity at 150° C., jettability at 150° C., image quality, lightfastness, and waterfastness of various ink compositions.

In preferred embodiments the liquid ester vehicle with a boiling point of higher than 150° C. and preferably between about 170° to about 300° C. and with a low acoustic-loss value of for example, from about 5 to about 40 dB/mm is present in the ink composition in an amount of from about 5 to about 45 percent by weight, the solid ester with for example, a melting point of from about 35° to about 74° C., and with an acoustic-loss value of below about 100 dB/mm and preferably from about 25 to about 80 dB/mm is present in an amount of from about 5 to about 45 percent by weight, the ester containing liquid crystalline compound is present in an amount of from about 65 to about 7 percent by weight, the ester UV absorber is present in an amount of from about 5 to about 1 percent by weight, the ester antioxidant is present in an amount of from about 5 to about 1 percent by weight, and the colorant is present in an amount of from about 2 to about 12 percent by weight, and wherein the total of these components is about 100.

Embodiments of the present invention include an ink composition comprised of a liquid cyclic ester lactone vehicle with a boiling point of higher than about 150, and preferably between about 170° to about 300° C. and with an acoustic-loss value of from about 5 to about 40 dB/mm including those liquid esters available from Aldrich Chemicals, such as butyrolactone, (3) α-acetyl-α-methyl-γ-butyrolactone, (4) (±)-β,β-dimethyl-γ-(hydroxy methyl)-γ-butyrolactone, (5) (S)-(+)-γ-ethoxycarbonyl-γ-butyro (6) (±)-α-carbethoxy-γ-phenyl-butyrolactone (7)γ-valerolactone, 8) (±)-mevalonic (β-hydroxy-β-methyl-δvalero) lactone, (9)γ-caprolactone, octanoiclactone, (11) γ-nonanoic lactone, (12)γ-decanolactone, (13) (±)-δ-decanol, (14) undecanoic γ-lactone, (15) (±)-undecanoic-δ-lactone, (Aldrich#29,127-7), (16) undecanoic-ω-lactone, (17) oxacyclotridecan-2-one, (18)-δ-dodecanolactone, and (19)ω-pentadeca lactone.

Embodiments of the present invention include an ink composition comprised of a liquid alkyl ester with a boiling point of higher than 150° C. and preferably from about 170° to about 300° C. and having an acoustic-loss value of from about 5 to about 40 dB/mm including liquid esters of (1) methyl heptanoate, (Aldrich#14,900-4), (2) methyl nonanoate, (Aldrich#24589-5), (3) methyl decanoate, (Aldrich#29,903-0), (4) methyl dodecanoate, (Aldrich #23, 459-1), (5) methyl tridecanoate, (Aldrich#M8,540-9), (6) ethyl hexanoate, (Aldrich#14,896-2), (7) ethyloctanoate, (Aldrich#11,232-1), (8) ethyl decanoate, (Aldrich#14,897-0), (9) ethyl tetradecanoate, (Aldrich#E3,960-0), (10) diethyloxalate, (Aldrich#13,536-4), (11) diethylmalonate, (Aldrich#D9,775-4), (12) diethyl succinate, (Aldrich#11, 240-2), (13) diethyl glutarate, (Aldrich#D9,600-6), (14) diethyl adipate, (Aldrich#24,572-0), (15) diethyl pimelate, (Aldrich #D9,970-6), (16) diethyl suberate, (Aldrich#D10, 060-9), (17) diethyl azelate (Aldrich#12,458-3), (18) diethyl sebacate, (Aldrich#24,607-7), (19) diethyl dodecanedioate, (Aldrich#13,753-7), (20) diethyl tetradecane dioate, (Aldrich#14,404-5), (21) diethyl methyl malonate, (Aldrich#12,613-6), (22) diethyl propyl malonate, (Aldrich#22,881-8), (23) diethyl butyl malonate (Aldrich#11,203-8), (24) diethyl benzyl malonate (Aldrich#13,554-2), and diethyl phenyl malonate (Aldrich#11,199-6), (CAS#102-19-2), (59) blueberry flavor compounds such as isobutyl 2-buteneoate, (CAS#589-66-2), (60) cognac flavor compounds such as ethyl oenanthate, (CAS#106-30-9), (61) dimethyl anthranilate, (CAS#85-91-6), (62) pear flavor ethyl decane-cis-4-trans-2-dienoate, (CAS#3025-30-7), (63) pineapple flavor allyl cyclohexane propionate, (Aldrich#41,165-5), (64) methyl cinnamate, (Aldrich#17,328-2), (65) and ethylmethylphenylglycidate, (CAS# 77-83-8).

Solid esters (2) that can be selected to fill, either substantially, or a percentage thereof, for example from about 50 to about 100 percent, the pores of paper and even its surface and having a melting point of for example, between about 35° about 74° C., and having an acoustic-loss value of below about, or equal to about 100 dB/mm and preferably from about 25 to about 80 dB/mm include (1) ethyl palmitate, (Aldrich#28,691-5), (2) methyl palmitate, (Aldrich#26,065-7), (3) ethyl, (Aldrich#22,317-4),(4) methyl heptadecanoate, (Aldrich#28,607-9), (5) methyl stearate, (Aldrich#M7,070-9) (6) methyl nonadecanoate, (Aldrich#28,683-4), (7) methyl eicosanoate, (Aldrich#25, 220-0), (8) methyl, (Aldrich#29,904-9), (9) methyl docosanoate, (Aldrich#85,527-8), (10) methyl tricosanoate, (Aldrich#28,734-2), (11) methyl tetracosanoate, (Aldrich#29,905-7), (12) γ-phenyl-γ-butyrolactone (Aldrich#17,645-1), (13) ethyl 2-oxocyclotridecane carboxylate, (Aldrich#42,753-5), (14) ethyl triacontanoate, (Aldrich#25,751-6), (15)(N -(tert-butoxycarbonyl)-3-cyclohexyl-L-alanine methyl ester, (Aldrich#42,171-5),(16) (N-(tert-butoxycarbonyl) glycine tert-butylester, (Aldrich#42,329-7), (17) (N-(carbonyl)-D-alanine methyl ester, (Aldrich#41,464-6), (18) (N-(tert-butoxycarbonyl)-L-alanine methyl ester, (Aldrich#42,357-2), (19) (N-(tert-butoxy carbonyl)-L-phenyl alanine methyl ester (Aldrich#42,170-7), (20) (N -(tert-butoxy carbonyl)- 3-iodo-D-alanine methyl ester, (Aldrich#42,603-2), and (21) N-carbobenzyloxy-L-glutamic acid 1-methyl ester (Aldrich#40,860-3).

Examples of liquid crystalline components, or compounds are (1) (−) 2-methyl butyl -4-(4'-methoxy benzylidene-amino) cinnamate a non cholesteryl chiral compound (CAS#24140-30-5), (2) (S)-(+)-2-methylbutyl-4-(4- decyloxy benzylidene-amino) cinnamate (Aldrich#32,476-6), (3) ethyl 4-ethoxybenzyl-4'-amino cinnamate (CAS # 28 63-94-7), (4) 4-[(S)-(-)-2-ethoxy propoxy]phenyl 4-(decyloxy) benzoate, (Aldrich#32,792-1), (5)4-[(R)-(−)2-chloro-3-methyl butyryloxyphenyl-4-(decyloxy) benzoate, (Aldrich#32,854-5), (6)4-[(S)-(+)2-chloro-3-methyl butyryl oxy]phenyl 4-(decyloxy)benzoate, (Aldrich#32,855-3), (7)4-[(S)-(+)-(4-methyl hexyloxy] phenyl 4-(decyloxy) benzoate, (Aldrich #32,792-1), (8)®-4-[(1-methylheptyloxy)carbonyl]phenyl 4'-octyloxy-4-biphenylcarboxylate, (Aldrich#40,886-7),(9)(S)-4-[(1-methylheptyloxy) carbonyl]phenyl 4'-octyloxy-4-biphenylcarboxylate, (Aldrich#40,885-9), (10) cholesteryl oleate, (Aldrich#37,293-5), and (11) cholesteryl oleyl carbonate (Aldrich #15,115-7).

The UV absorbing compounds are for example, selected from the group consisting of (1) glycerol 4-amino benzoate, available as Escalol 106, from Van Dyk Corporation, (2) resorcinol mono benzoate, available as RBM, from Eastman Chemicals, (3) octyl dimethyl amino benzoate, available as Escalol 507, from Van Dyk Corporation, (4) hexadecyl 3,5-di-tert-butyl-4-hydroxy-benzoate, available as Cyasorb UV-2908, #41,320-8, from Aldrich Chemical company, (5), octyl salicylate, available as Escalol 106, from Van Dyk, and (6) octyl methoxy cinnamate, available as Parasol MCX, from Givaudan Corporation.

The antioxidant ester compounds of the ink compositions are for example, selected from the group consisting of (1) didodecyl-3,3'-thiodipropionate, available as Cyanox, ITDP, #D12,840-6, from Aldrich Chemical Company, (2) ditridecyl-3,3'-thiodipropionate, available as Cyanox 711, #41,311-9, from Aldrich Chemical Company), (3) ditetradecyl-3,3'-thiodipropionate, available as Cyanox MTDP, #41,312-7, from Aldrich Chemical Company, (4) dicetyl-3,3'-thiodipropionate, available as Evanstab 16 from Evans Chemetics Corporation, (5) dioctadecyl 3,3'-thiodipropionate, available as Cyanox, STDP#41,310-0, from Aldrich Chemical Company, (6) triethyleneglycol-bis [3-(3'-tert-butyl-4'-hydroxy-5'-methyl-phenyl)propionate], available as Irganox-245, from Ciba-Geigy Corporation, (7)ethyl(R)-(+)-2-{4-]trifluoromethyl) phenoxy] phenoxy}propionate, (Aldrich#25,074-0), (8)3-hydroxy-2, 2-dimethylpropyl 3-hydroxy-2,2-dimethylpropionate, (Aldrich#39,024-0), (9) 1,6-hexamethylene bis(3,5-di-tert-butyl-4-hydroxy hydrocinnamate), available as Irganox 259, from Ciba-Geigy Corporation, (10) tetrakis [methylene(3,5-di-tert-butyl-4-hydroxy hydrocinnamate), available as Irganox-1010, from Ciba-Geigy-Corporation, (11) thiodiethylene-bis (3,5-di-tert-butyl-4-hydroxy) hydrocinnamate available as Irganox 1035, from Ciba-Geigy Corporation, (12) octadecyl 3,5-di-tert-butyl-4-hydroxy hydrocinnamate, available as Irganox-1076, from Ciba-Geigy Corporation, (13) N,N'-hexamethylene-bis (3,5-di-tert-butyl-4-hydroxy hydrocinnamate), available as Irganox 1098, from Ciba-Geigy-Corporation, and (14) 2,2-bis[4-(2-(3,5-di-tert-butyl-4-hydroxyhydrocinnamoyloxy)) ethoxy phenyl] propane, available as Topanol 205, from ICI America Corporation.

In embodiments, the liquid crystalline compound is preferably an ester, that is a fluid ordered state that exists between the solid state of the ester and fluid solution of the ester, and these crystalline esters possess a melting point of, for example, less than about 80, and for example, from about 50 to about 70 degrees Centigrade; the UV ester absorbs UV light and also functions as light stabilizer; the lightfastness antioxidant ester protects the image from oxidizing agents, such as oxygen; and the ink optical density values are for, example, cyan, 1.55, magenta, 1.60, yellow, 1.0, black 1.75, each value within plus or minus 0.05.

Suitable colorants present in various effective amounts, and generally of from about 1 to about 20, and for example, from about 2 to about 12 percent by weight, include pigments and dyes, with solvent dyes being preferred. Any suitable dye or pigment may be selected, especially if it is capable of being dispersed or dissolved in the ink vehicle and is compatible with the other ink components. Colorant, or colorants includes dyes, pigments, mixtures thereof, mixtures of pigments, mixtures of dyes, and the like.

Examples of pigments include Violet Toner VT-8015 (Paul Uhlich), Paliogen Violet 5100 (BASF), Paliogen Violet 5890 (BASF),Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Toluidine Red (Aldrich ), Scarlet for Thermoplast NSD PS PA (Ugine Kuhlmann of Canada ), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2GO1 (American Hoechst), Irgalite Blue BCA (Ciba-Geigy), Paliogen Blue 6470 (BASF), Sudan III (Red Orange), (Matheson, Colemen Bell), Sudan II (Orange), (Matheson, Colemen, Bell ), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (Du Pont), Paliogen Black L0084 (BASF), Pigment Black K801 (BASF), and carbon blacks such as Regal 330® (Cabot), Carbon Black 5250, Carbon Black 5750 (Columbia Chemical Company).

Examples of dyes include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz,Inc.; Tartrazine Extra Conc. (FD&C Yellow #5, Acid Yellow 23), available from Sandoz,Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.;

and the like. Particularly preferred are solvent dyes, and within the class of solvent dyes, spirit soluble dyes are preferred primarily because of their compatibility with the ink vehicles. Examples of suitable spirit solvent dyes include Neozapon Red 492 (BASF), Orasol Red G (Ciba-Geigy), Direct Brilliant Pink B (Crompton-Knolls), Aizen Spilon Red C- BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167,Cartasol Brilliant Yellow 4GF (Sandoz), Pergasol Yellow CGP (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc. A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like.

The inks of the present invention may also include known ink additives, such as humectants, biocides, and the like, and which additives are selected in various suitable amounts, such as for example, from about 0.05 to about 5, and preferably about 1 weight percent.

Biocides include Dowicil 150, 200, and 75, benzoate salts, sorbate salts, and the like, present in effective amounts, such as for example an amount of from about 0.0001 to about 2 percent by weight, and preferably from about 0.01 to about 1.0 percent by weight. The biocide and other ink additives, can each be present in amounts of from about 10 to 25 milligrams per one gram of ink.

The inks of the present invention are particularly suitable for printing processes wherein the substrate, such as paper, transparency material, or the like, is heated during the printing process to facilitate formation of a liquid crystalline phase within the ink. When transparency substrates are employed, temperatures typically are a maximum of about 100° C. to about 110° C., since the polyester typically employed as the base sheet tends to deform at higher temperatures. Specially formulated transparencies and paper substrates can, however, tolerate higher temperatures, and frequently are suitable for exposure to temperatures of 150° C. or even about 200° C. in some instances. Typical heating temperatures are from about 40° C. to about 140° C., and preferably from about 60° C. to about 95° C., although the temperature can be outside these ranges. The inks of the present invention can be prepared by any suitable method. For example, a colored semi-solid hot melt ink composition was prepared by mixing 35 percent by weight of an ester liquid vehicle having an acoustic-mixing loss value of less than about 40 dB/mm and a boiling point of greater than 150° C., 35 percent by weight of a solid ester with a melting point of lower than about 75° C. and an acoustic-loss value of less than about 100 dB/mm, 20 percent by weight of a liquid crystalline material, 2 percent by weight of a lighfastness UV absorber, 2 percent by weight of a lightfastness antioxidant and 6 percent by weight of a colorant. The mixture was then heated to a temperature of about 100° C. and stirred for a period of about 60 minutes until it formed a homogeneous solution, and subsequently was cooled to 25° C.

The inks of the present invention can be selected for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, IBM Technical Disclosure Bulletin, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (for example, the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to accomplish brief, controlled excursions to a sufficiently high pressure level for overcoming the restraining force of surface tension, which in turn, causes individual droplets of the ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Also, regardless of the timing mechanism employed, the size of the ejected droplets is usually determined by the waist diameter of the focused acoustic beam. Acoustic ink printing is attractive primarily because it does not require the nozzles or the small ejection orifices which have caused many of the problems with thermal ink jet processes.

The size of the ejection orifice is an important design parameter of an ink jet primarily because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, thus acoustic printing can be performed with a greater variety of inks than conventional ink jet printing, including inks with higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (for example, single ejector/pixel/line) for ordinary line printing. Inks suitable for acoustic ink jet printing typically are liquid at ambient temperatures (i.e., about 25° C.), however in other embodiments the ink is in a solid state at ambient temperatures and provision is made for liquefying the ink by heating or any other suitable method prior to introduction of the ink into the printhead. Images of two or more colors can be generated by several methods, including processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl Phys.*, vol. 65, no. 9 (1 May 1989) and references therein, the disclosure of which are totally incorporated herein by reference.

Acoustic-loss measurements were measured as follows: samples, about 5 to about 10 grams, of various liquid ester vehicles and solid ester compounds were placed between two transducers, with the temperature set at 150° C. The samples were allowed to equilibrate at 150° C. for five minutes. The two transducers were brought together to maximize the acoustic signal. The amplitude and the position of the signals were recorded. The two transducers were separated by a distance varying from 25.4 microns to 125.4 microns recording each time the amplitude and the position of the signal. Each measurement was performed three times and three samples of the same material were measured. The attenuation dB/mm was then calculated by ratioing the amplitude values obtained at different separation distances. The liquid esters of the present application possess for example dB/mm values of from about 20 to about 40, and the solid esters possess for example, dB/mm values of from about to about 40 to about 55. A value of less than about 80 dB/mm for the ink composition can be an important parameter for the acoustic jetting of inks.

The optical density measurements were obtained on a Pacific Pectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

The lightfastness values of the ink jet images were measured in the Mark V Lightfast Tester obtained from Microscal Company, London, England.

The waterfastness values of the ink jet images were obtained from the optical density data recorded before and after washing with hot [50° C.] water for two minutes.

Specific embodiments of the invention will now be described in detail. These examples are intended to be illustrative, and the invention is not limited to the materials, conditions, or process parameters set forth in these embodiments. All parts and percentages are by weight unless otherwise indicated, and the temperatures are in degrees Centigrade.

EXAMPLE 1

A black semi-solid hot melt ink composition was prepared by mixing 35 percent by weight of a liquid ester γ-butyrolactone, (Aldrich#B10,360-8), having an acoustic-loss value of 22 dB/mm and a boiling point of 205° C., 35 percent by weight of the solid additive methyl tetracosanoate, (Aldrich#29,905-7) which solid evens the surface of the paper and has a melting point of 62° C. and an acoustic-loss value of 38 dB/mm, 20 percent by weight of the liquid crystalline ester material 4-[(R)-(−)2-chloro-3-methyl butyryloxy] phenyl-4-(decyloxy) benzoate, (Aldrich#32,854-5), 2 percent by weight of the UV absorber hexadecyl 3,5-di-tert-butyl-4-hydroxy-benzoate, Aldrich#41,320-8, melting point 60° C., 2 percent by weight of the antioxidant 3-hydroxy-2,2-dimethyl propyl-3-hydroxy-2,2-dimethyl propionate, (Aldrich#39,024-0), melting point 52° C., and 6 percent by weight of the colorant Orasol Black RLP (Ciba-Geigy). The resulting mixture was heated to a temperature of about 100° C. and then stirred for a period of about 60 minutes until it formed a homogeneous solution, and subsequently the solution mixture was cooled to 25° C. The black ink resulting had an acoustic loss value of 40 dB/mm and a viscosity of 4.75 cps at 150° C.

EXAMPLE 2

A blue semi-solid hot melt ink composition was prepared by mixing 35 percent by weight of a liquid ester γ-butyrolactone, (Aldrich#B10,360-8), with an acoustic-loss value of about 22 dB/mm and a boiling point of 205° C., 35 percent by weight of the solid ester methyl tetracosanoate, (Aldrich#29,905-7) with a melting point of 62° C. and an acoustic-loss value of 38 dB/mm, 20 percent by weight of the liquid crystalline ester 4-[(R)-(−)2-chloro-3-methyl butyryloxy] phenyl-4-(decyloxy) benzoate, (Aldrich#32, 854-5), 2 percent by weight of the UV absorber hexadecyl 3,5-di-tert-butyl-4-hydroxy-benzoate, Aldrich#41,320-8, melting point 60° C., 2 percent by weight of the antioxidant 3-hydroxy-2,2-dimethyl propyl-3-hydroxy-2,2-dimethyl propionate, (Aldrich#39, 024-0), melting point 52° C., and 6 percent by weight of a colorant Sudan Blue dye (BASF). The resulting mixture was heated to a temperature of about 100° C. and stirred for a period of about 60 minutes until it formed a homogeneous solution, and subsequently the solution was cooled to 25° C. This black ink had an acoustic loss value of 40 dB/mm and a viscosity of 4.9 cps at 150°C.

EXAMPLE 3

A yellow semi-solid hot melt ink composition was prepared by mixing 35 percent by weight of the liquid ester γ-butyrolactone, (Aldrich #B10,360-8), with an acoustic-loss value of about 22 dB/mm and a boiling point of 205° C., 35 percent by weight of the solid ester methyltetracosanoate, (Aldrich#29,905-7) with a melting point of 62° C. and an acoustic-loss value of 38 dB/mm, 20 percent by weight of the liquid crystalline ester 4-[(R)-(−)2-chloro-3-methyl butyryl oxy] phenyl-4-(decyloxy) benzoate, (Aldrich#32,854-5), 2 percent by weight of the UV lightfastness absorber hexadecyl 3,5-di-tert-butyl-4-hydroxy-benzoate, Aldrich#41,320-8, melting point 60° C., 2 percent by weight of the lightfastness antioxidant 3-hydroxy-2,2-dimethyl propyl-3-hydroxy-2,2-dimethyl propionate, (Aldrich#39, 024-0), melting point 52° C., and 6 percent by weight of the colorant Sudan yellow dye (BASF). The resulting mixture was heated to a temperature of about 100° C. and stirred for a period of about 60 minutes until it formed a homogeneous solution, and thereafter the solution was cooled to 25° C. This yellow ink had an acoustic loss value of 41 dB/mm and a viscosity of 4.9 cps at 150° C.

EXAMPLE 4

A red semi-solid hot melt ink composition was prepared by mixing 35 percent by weight of the liquid ester γ-butyrolactone, (Aldrich# B10,360-8), with an acoustic-loss value of about 22 dB/mm and a boiling point of 205° C., 35 percent by weight of the solid ester methyl tetracosanoate, (Aldrich#29,905-7) with a melting point of 62° C. and an acoustic-loss value of 38 dB/mm, 20 percent by weight of the liquid crystalline ester 4-[(R)-(-)2-chloro-3-methyl butyryl oxy] phenyl-4-(decyloxy) benzoate, (Aldrich#32,854-5), 2 percent by weight of the UV absorber hexadecyl 3,5-di-tert-butyl-4-hydroxy-benzoate, Aldrich#41,320-8, melting point 60° C., 2 percent by weight of the antioxidant 3-hydroxy-2,2-dimethyl propyl-3-hydroxy-2,2-dimethyl propionate, (Aldrich#39,024-0), melting point 52° C., and 6 percent by weight of the colorant Sudan Red dye (BASF). The resulting mixture was heated to a temperature of about 100° C. and then stirred for a period of about 60 minutes until it formed a homogeneous solution, and subsequently the solution was cooled to 25° C. This red ink had an acoustic loss value of 42 dB/mm and a viscosity of 5.2 cps at 150° C.

Each of the above four inks were incorporated into an acoustic ink jet printing test fixture utilizing the ejection mechanism disclosed in *J. Appl. Phys.* 65(9), 1 May 1989, and references therein, the disclosure of which are totally incorporated herein by reference. A jetting frequency of 160 MHz was used to generate drops of about 2 picoliters, up to 12 drops per pixel at 600 spi. The images formed exhibited excellent color quality with optical density values of 1.65 (Black), 1.65 (Cyan), 1.45 (Magenta), 0.9 (Yellow), and sharp edges, with lightfastness and waterfastness of greater than about 98.5, and more specifically about 99.7 percent for all developed images.

EXAMPLE 5

A black semi-solid hot melt ink composition was prepared by mixing 35 percent by weight of the liquid ester diethyl propyl malonate, (Aldrich#22,881-8), with an acoustic-loss value of about 23 dB/mm and a boiling point of 222° C., 35 percent by weight of the solid ester (N-(tert -butoxy carbonyl) glycine tert-butylester, (Aldrich#42,329-7), with a melting point of 67° C. and an acoustic-loss value of 41 dB/mm, 20 percent by weight of the liquid crystalline ester material (R)-4-[(1-methylheptyloxy)carbonyl]phenyl 4'-octyloxy-4-biphenylcarboxylate, (Aldrich#40,886-7), 2 percent by weight of the UV absorber hexadecyl 3,5-di-tert-butyl-4-hydroxy-benzoate, Aldrich#41,320-8, melting point 60° C., 2 percent by weight of the antioxidant 3-hydroxy-2,2-dimethyl propyl-3-hydroxy-2,2-dimethyl propionate, (Aldrich#39,024-0), melting point 52° C., and 6 percent by weight of the colorant Orasol Black RLP (Ciba-Geigy). The resulting mixture was heated to a temperature of about 100° C. and then stirred for a period of about 60 minutes until it formed a homogeneous solution, and subsequently the solution was cooled to 25° C. This black ink had an acoustic loss value of 42 dB/mm and a viscosity of 4.8 cps at 150° C.

EXAMPLE 6

A blue semi-solid hot melt ink composition was prepared by mixing 35 percent by weight of the liquid ester diethyl propyl malonate, (Aldrich#22,881-8), with an acoustic-loss value of about 23 dB/mm and a boiling point of 222° C., 35 percent by weight of the solid ester (N-(tert-butoxy carbonyl) glycine tert-butylester, (Aldrich#42,329-7 with a melting point of 67° C. and an acoustic-loss value of 41 dB/mm, 20 percent by weight of the liquid crystalline ester material (R)-4-[(1-methylheptyloxy)carbonyl]phenyl 4'-octyloxy-4-biphenylcarboxylate, (Aldrich#40,886-7), 2 percent by weight of the UV absorber hexadecyl 3,5-di-tert-butyl-4-hydroxy-benzoate, Aldrich #41,320-8, melting point 60° C., 2 percent by weight of the antioxidant 3-hydroxy-2,2-dimethyl propyl-3-hydroxy-2,2-dimethyl, and 6 by weight of the colorant Sudan Blue dye (BASF). The mixture resulting was then processed as in Example 5 and then stirred for a period of about 60 minutes until it formed a homogeneous solution, and subsequently the solution was cooled to 25° C. This black ink had an acoustic loss value of 40 dB/mm and a viscosity of 4.8 cps at 150° C.

EXAMPLE 7

A yellow semi-solid hot melt ink composition was prepared by mixing 35 percent by weight of the liquid ester diethyl propyl malonate, (Aldrich#22,881-8), with an acoustic-loss value of about 23 dB/mm and a boiling point of 222° C., 35 percent by weight of the solid ester (N-(tert-butoxy carbonyl) glycine tert-butylester, (Aldrich#42,329-7), with a melting point of 67° C. and an acoustic-loss value of 41 dB/mm, 20 percent by weight of the liquid crystalline ester (R)-4-[(1-methylheptyloxy)carbonyl]phenyl 4'-octyloxy-4-biphenylcarboxylate, (Aldrich#40,886-7), 2 percent by weight of the UV absorber hexadecyl 3,5-di-tert-butyl-4-hydroxy-benzoate, Aldrich#41,320-8, melting point 60° C., 2 percent by weight of the antioxidant 3-hydroxy-2,2-dimethyl propyl-3-hydroxy-2,2-dimethyl propionate, (Aldrich#39,024-0), melting point 52° C., and 6 percent by weight of the colorant Sudan yellow dye (BASF). The resulting mixture was heated to a temperature of about 100° C. and then stirred for a period of about 60 minutes until it formed a homogeneous solution, and subsequently the solution was cooled to 25° C. This yellow ink had an acoustic loss value of 41 dB/mm and a viscosity of 4.9 cps at 150° C.

EXAMPLE 8

A red semi-solid hot melt ink composition was prepared by mixing 35 percent by weight of the liquid ester diethyl propyl malonate, (Aldrich#22,881-8), with an acoustic-loss value of about 23 dB/mm and a boiling point of 222° C., 35 percent by weight of the solid ester N-(tert -butoxy carbonyl) glycine tert-butylester, (Aldrich#42,329-7), with a melting point of 67° C. and an acoustic-loss value of 4dB/mm, 20 percent by weight of the liquid crystalline ester (R)-4-[(1-methylheptyloxy)carbonyl]phenyl 4'-octyloxy-4-biphenylcarboxylate, (Aldrich#40,886-7), 2 percent by weight of the UV absorber hexadecyl 3,5-di-tert-butyl-4-hydroxy-benzoate, Aldrich#41,320-8, melting point 60° C., 2 percent by weight of the antioxidant 3-hydroxy-2,2-dimethyl propyl-3-hydroxy-2,2-dimethyl propionate, (Aldrich#39,024-0), melting point 52° C., and 6 percent by weight of the colorant Sudan Red dye (BASF ). The mixture resulting was heated to a temperature of about 100° C. and then stirred for a period of about 60 minutes when it formed a homogeneous solution, and subsequently the solution was cooled to 25° C. This red ink had an acoustic loss value of 42 dB/mm and a viscosity of 4.86 cps at 150° C.

Each of the above prepared four inks were incorporated into an acoustic ink jet printing test fixture utilizing the ejection mechanism disclosed in *J. Appl Phys.* 65(9), 1 May 1989, and references therein, the disclosure of which are totally incorporated herein by reference. A jetting frequency of 160 MHz was used to generate drops of about 2 picoliters, up to 12 drops per pixel at 600 spi. The images formed exhibited excellent color quality sharpness with optical density values of 1.68 (Black),1.69 (Cyan), 1.42 (Magenta), 0.95 (Yellow), sharp edges, with lightfastness and waterfastness of greater than 99 percent for each of the developed images and more specifically from about 99.3 to about 99.7 percent.

The process of Example 1 was repeated with the liquid ester vehicles cholesteryl oleyl carbonate, 4'-(hexyloxy)-4-biphenyl carbonitrile, or ditetradecyl-3,3-thiodipropionate, in place of the liquid butyrolactone ester with substantially similar results. Moreover, the process of the above Examples can be repeated it is believed with different suitable effective amounts of components.

Other modifications of the present invention may occur to those of ordinary skill in the art subsequent to a review of the present application, and these modifications, including equivalents thereof, are intended to be included within the scope of the present invention.

What is claimed is:

1. A nonaqueous ink composition comprised of (1) a liquid ester vehicle with an acoustic-loss value of from about 5 to about 40 dB/mm, (2) a solid ester compound with a melting point of from about 35° to about 75° C. and an acoustic-loss value of from about 25 to about 80 dB/mm, (3) a liquid crystalline ester compound, (4) a lightfastness UV absorber, (5) a lightfastness antioxidant, and (6) a colorant.

2. A nonaqueous ink composition in accordance with claim 1 wherein the liquid ester vehicle with an acoustic-loss value of from about 5 to about 40 dB/mm is present in an amount of from about 0.5 to about 49 percent by weight, the solid ester compound (2) is present in an amount of from about 0.5 to about 49 percent by weight, the liquid crystalline ester compound (3) is present in an amount of from about 69 to about 1 percent by weight, the lightfastness UV absorber (4) is an ester present in an amount of from about 5 to about 0.25 percent by weight, the antioxidant is an ester present in an amount of from about 5 to about 0.25 percent by weight, and the colorant is present in an amount of from about 20 to about 0.5 percent by weight, and which ink has an acoustic-loss value of from about 10 to about 80 dB/mm, and which ink possesses a viscosity of from about 1 centipoise to about 10 centipoise at a temperature of from about 125° C. to about 165° C.

3. A nonaqueous ink in accordance with claim 1 wherein the ester vehicle with an acoustic-loss value of from about 5 to about 40 dB/mm, is selected from the group consisting of cyclic ester lactones of (1) γ-butyrolactone, (2) α-acetyl-α-methyl -γ-butyrolactone, (3) (±)-β,β-di methyl-γ-(hydroxymethyl)-γ-butyrolactone, (4) γ-valerolactone, (5) β-hydroxy-β-methyl-δ-valerolactone, (6) α-octanoic lactone, (7) decanolactone, (8) undecanoic-ω-lactone, (9) oxacyclotridecan-2-one, and (10) ω-penta decalactone.

4. A nonaqueous ink composition in accordance with claim 1 wherein the ester vehicle with an acoustic-loss value of from about 5 to about 40 dB/mm, is selected from the group consisting of alkyl esters of (1) methyl tridecanoate, (2) ethyl tetradecanoate, (3) diethyl tetradecane dioate, (4) diethyl propyl malonate, (5) suberic acid monomethyl ester, (6) ethyl-trans-cinnamate, (7) ethylene dodecanedioate, (8) isobutyl-2-buteneoate, (9) dimethyl anthranilate, and (10) ethyl decane-cis-4-trans-2-dienoate.

5. A nonaqueous ink composition in accordance with claim 1 wherein the solid ester compound is selected from the group consisting of solid alkyl esters of (1) methyltetracosanoate, (2) ethyl2-oxocyclotridecanecarboxylate, (3) ethyltriacontanoate, (4) (N-(tert-butoxy carbonyl)-3-cyclohexyl-L-alanine methyl ester, (5) (N-(tert-butoxy carbonyl) glycine tert-butylester, (6) (N-(tert-butoxy carbonyl)-D-alanine methyl ester, (7) (N-(tert-butoxycarbonyl)-L-alanine methyl ester, (8) (N-(tert-butoxy carbonyl)-L-phenyl alanine methyl ester, (9) (N-(tert-butoxy carbonyl)-3-iodo-D-alaninemethylester, and (10) N-carbobenzyloxy-L-glutamic acid 1-methyl ester.

6. A nonaqueous ink composition in accordance with claim 1 wherein the liquid crystalline ester compound is selected from the group consisting of (1) (−)2-methylbutyl-4-(4'-methoxy benzylidene-amino) cinnamate, (2) (S)-(+)-2-methylbutyl-4-(4-decyloxybenzylidene-amino) cinnamate, (3) ethyl-4-ethoxybenzyl-4'-aminocinnamate, (4) 4-[(R)-(−)2-chloro-3-methylbutyryl oxy]phenyl-4-(decyloxy)benzoate, (5) 4-[(S)-(+)2-chloro-3-methylbutyryloxy]phenyl-4-(decyloxy)benzoate, (6) 4-[(S)-(+)-(4-methylhexyl)oxy]phenyl-4-(decyloxy) benzoate, (7) 4-[(S)-(−)-2-ethoxypropoxy]phenyl-4-(decyloxy) benzoate, (8) 4-[(1-methylheptyloxy)carbonyl]phenyl-4'-octyloxy-4-biphenylcarboxylate, (9) cholesteryl oleate, and (10) cholesteryl oleyl carbonate.

7. A non aqueous ink in accordance with claim 1 wherein the lightfastness UV absorber is selected from the group consisting of (1) glycerol 4-amino benzoate, (2) resorcinol mono benzoate, (3) octyl dimethyl amino benzoate, (4) hexadecyl3,5-di-tert-butyl-4-hydroxy-benzoate, (5), octyl salicylate, and (6) octyl methoxy cinnamate.

8. A nonaqueous ink in accordance with claim 1 wherein the lightfastness antioxidant is selected from the group consisting of (1) didodecyl-3,3'-thiodipropionate, (2) ditetradecyl-3,3'-thiodipropionate, (3) diocta decyl-3,3'-thio dipropionate, (4) triethyleneglycol-bis[3-(3'-tert-butyl-4'-hydroxy-5'-methyl-phenyl)propionate], (5) 3-hydroxy-2,2-dimethylpropyl3-hydroxy-2,2-dimethylpropionate, (6) 1,6-hexamethylene-bis (3,5-di-tert-butyl-4-hydroxyhydro cinnamate), (7) tetrakis [methylene (3,5-di-tert-butyl-4-hydroxyhydrocinnamate), (8) thiodiethylene-bis (3,5-di-tert-butyl-4-hydroxy) hydrocinnamate, (9) octadecyl-3,5-di-tert-butyl-4-hydroxyhydrocinnamate, (10) 2,2-bis[4-(2-(3,5-di-tert-butyl-4-hydroxyhydrocinnamoyloxy)) ethoxyphenyl]propane.

9. A nonaqueous ink in accordance with claim 1 further containing ink additives.

10. An ink in accordance with claim 1 wherein the colorant is selected in an amount of from about 0.5 to about 20 percent by weight.

11. An ink in accordance with claim 1 wherein the colorant is selected in an amount of from about 2 to about 12 percent by weight.

12. An ink in accordance with claim 1 wherein the colorant is a pigment, or a dye.

13. An ink in accordance with claim 1 wherein the colorant is cyan, magenta, yellow, black, or mixtures thereof.

14. An ink in accordance with claim 1 wherein (1) the liquid ester vehicle is γ-butyrolactone;diethyl propyl malonate, (2) the solid ester compound is methyl tetracosanoate, or (N-(tert butoxy carbonyl) glycine tert-butylester, (3) the liquid crystalline ester compound is (R)-4-[(1-methylheptyloxy) carbonyl]phenyl 4'-octyloxy-4-biphenyl carboxylate, or 4-[(R)-(−) 2-chloro-3-methyl butyryloxy]phenyl-4-(decyloxy) benzoate, (4) the lightfastness UV absorber is hexadecyl3,5-di-tert-butyl-4-hydroxy-benzoate, or glycerol 4-amino benzoate, and (5) the lightfastness antioxidant is 3-hydroxy-2,2-dimethyl propyl-3-hydroxy-2,2-dimethyl propionate, or dioctadecyl-3,3'-thiodipropionate.

15. An ink in accordance with claim 1 with a viscosity of from about 1 centipoise to about 5 centipoise.

16. An ink in accordance with claim 1 with a viscosity of from about 1 centipoise to about 10 centipoise and an acoustic loss of from about 25 to about 65 dB/mm.

17. An ink comprised of (1) a liquid ester vehicle, (2) a solid ester compound, (3) a liquid crystalline ester compound, (4) a UV absorber, (5) an antioxidant, and (6) a colorant.

18. An ink in accordance with claim 17 wherein the UV absorber is an ester, the antioxidant is an ester, and wherein said ink possesses an acoustic-loss value of from about 10 to about 80 dB/mm and a viscosity of from of from about 1 to about 20 centipoise.

19. An ink in accordance with 18 wherein the colorant is a dye.

20. An ink in accordance with claim 18 wherein the colorant is present in an amount of from about 1 to about 15 weight percent, and said viscosity is from about 1 to about 10 at a temperature of from about 135 to about 150 degrees Centigrade.

21. An ink composition in accordance with claim 17 wherein (1) said liquid ester vehicle possesses an acoustic-loss value of from about 5 to about 40 dB/mm, (2) said solid ester compound possesses a melting temperature of from about 35° to about 75° C. and an acoustic-loss value of from about 25 to about 80 dB/mm, (4) said UV absorber is an ester, (5) said antioxidant is an ester, and wherein said ink has an acoustic-loss value of from about 10 to about 80 dB/mm, a melting temperature of from about 25 to about 45 degrees Centigrade, and a viscosity of from about 1 centipoise to about 10 centipoise at a temperature of from about 125° C. to about 165° C.

22. A printing process which comprises incorporating into an acoustic ink jet printer the ink of claim 1, and causing droplets of the ink to be ejected in imagewise pattern onto a substrate.

23. A process which comprises (a) providing an acoustic ink printer having a pool of the liquid ink of claim 17 with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

24. A process in accordance with claim 23 wherein said ink is comprised of (1) a liquid ester vehicle with an acoustic-loss value of from about 5 to about 40 dB/mm, (2) a solid ester compound with a melting point of from about 35° to about 74° C., (3) a liquid crystalline ester compound, (4) an ester lightfastness UV absorber, (5) an ester lightfastness antioxidant, and (6) a colorant, and which ink has an acoustic-loss value of from about 10 to about 80 B/mm, and a viscosity of from about 1 centipoise to about 10 centipoise at a temperature of from about 125° C. to about 165° C.

* * * * *